United States Patent
Chang

(10) Patent No.: US 7,413,324 B2
(45) Date of Patent: Aug. 19, 2008

(54) BACKLIGHT MODULE HAVING SUPPORTING POSTS AND BUMPY REFLECTIVE PLATE

(75) Inventor: Shao-Han Chang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 0 days.

(21) Appl. No.: 11/503,719

(22) Filed: Aug. 14, 2006

(65) Prior Publication Data
US 2007/0035942 A1    Feb. 15, 2007

(30) Foreign Application Priority Data
Aug. 12, 2005  (TW) ............... 94127483 A

(51) Int. Cl.
*F21V 4/00* (2006.01)
(52) U.S. Cl. .................. 362/225; 362/346; 362/297
(58) Field of Classification Search ............. 362/225, 362/240–241, 29–30, 247, 260, 297, 346; 349/70
See application file for complete search history.

(56) References Cited
U.S. PATENT DOCUMENTS

| 5,186,537 A | 2/1993 | Katoh et al. |
| 2004/0257792 A1* | 12/2004 | Yu et al. ................. 362/31 |
| 2005/0073858 A1* | 4/2005 | Kim et al. ................ 362/561 |
| 2006/0050500 A1* | 3/2006 | Chang et al. .............. 362/29 |
| 2006/0158905 A1* | 7/2006 | Lai et al. ................. 362/634 |
| 2007/0047225 A1* | 3/2007 | Sudo ..................... 362/225 |

* cited by examiner

Primary Examiner—Jong-Suk (James) Lee
Assistant Examiner—Julie A. Shallenberger
(74) Attorney, Agent, or Firm—Wei Te Chung

(57) ABSTRACT

An exemplary backlight module (100) includes a diffusion sheet (110), a plurality of light sources (120), a plurality of supporting posts (130), a plurality of fasteners (140), and a reflective plate (150). The supporting posts are disposed generally between the reflective plate and the diffusion sheet to form a gap with a predetermined distance between the reflective plate and the diffusion sheet. The fasteners are engaged with the reflective plate and hold the light sources to mount the light sources in the gap above the reflective plate. The reflective plate comprises a plurality of elongate bumps (151), and the bumps face toward the diffusion sheet. Each bump is located midway between two adjacent light sources for concentrating and guiding reflected light beams toward a corresponding area of the diffusion sheet above the bump.

1 Claim, 3 Drawing Sheets

BACKLIGHT MODULE HAVING SUPPORTING POSTS AND BUMPY REFLECTIVE PLATE

FIELD OF THE INVENTION

The present invention relates to backlight modules, and particularly to a direct type backlight module typically used for liquid crystal display (LCD) devices.

BACKGROUND

A typical LCD device includes an LCD panel, and a backlight module mounted under the LCD panel for supplying light beams thereto. The backlight module is generally classified into one of two types—a direct type or an edge type—according to the position in which a light source is installed in a backlight unit of the backlight module.

In the case of a direct type backlight module, the light source may be one or more elongate lamps or a plurality of light emitting diodes (LEDs). A light spreading plate and a light reflection plate are installed at top and bottom sides of the light source respectively. The light spreading plate is located directly under the LCD panel. Accordingly, some light beams are substantially directly output from the light source to the LCD panel positioned above the light spreading plate, and other light beams reflected from the light reflection plate are then substantially directly output to the LCD panel.

FIG. 5 is a schematic, side cross-sectional view of a conventional backlight module. The backlight module 10 includes a diffusion sheet 11, a plurality of lamps 12, and a reflective plate 13. The lamps 12 are disposed between the diffusion sheet 11 and the reflective plate 13. The diffusion sheet 11 and the reflective plate 13 are thin, and each of the lamps 12 is elongate.

When the size of the LCD device increases, the size of the lamps 12 used therein should also increase. If the lamps 12 are unduly long, they may not be secure and may be prone to break. This is particularly the case when the LCD device is subjected to vibration or shocking during use or transportation.

FIG. 6 shows another kind of conventional backlight module. The backlight module 20 has a structure similar to that of the backlight module 10, and includes a diffusion sheet 21, a reflective plate 23, and a plurality of lamps 22 disposed between the diffusion sheet 21 and the reflective plate 23. The backlight module 20 further includes a plurality of posts 24 disposed between the reflective plate 23 and the diffusion sheet 21, to ensure that a gap with a predetermined distance is formed between the reflective plate 23 and the diffusion sheet 21. The lamps 22 are fixed to corresponding fasteners 26. The fasteners 26 tightly and securely fasten the lamps 22 in the backlight module 20. This helps prevent the lamps 22 from sustaining damage when the backlight module 20 is subjected to vibration or shock during use or transportation.

FIG. 7 shows reflective optical paths in the backlight module 20. Some of light beams (not shown) emitted by the lamps 22 directly transmit to the diffusion sheet 21. Other light beams emitted by the lamps 22 transmit to the diffusion sheet 21 after being reflected by the reflective plate 23. The light beams then pass through the diffusion sheet 21 to illuminate an associated liquid crystal display panel.

However, a majority of the light beams are transmitted to areas of the diffusion sheet 21 directly above the lamps 22, whereas a smaller quantity of the light beams are transmitted to areas 25 of the diffusion sheet 21 that are generally between each two adjacent lamps 22. Moreover, the fasteners 26 block transmission of some of the light beams emitted by the lamps 22. Thus light intensity distribution in the areas directly above the lamps 22 is greater than light intensity distribution in the areas 25 generally between the lamps 22. This uneven light intensity distribution at the diffusion sheet 21 typically prevents the backlight module 20 from attaining a highly uniform light intensity distribution.

Accordingly, what is needed is a backlight module that can overcome the above-described deficiencies.

SUMMARY

An exemplary backlight module includes a diffusion sheet, a plurality of light sources, a plurality of supporting posts, a plurality of fasteners, and a reflective plate. The supporting posts are disposed generally between the reflective plate and the diffusion sheet to form a gap with a predetermined distance between the reflective plate and the diffusion sheet. The fasteners are engaged with the reflective plate and hold the light sources to mount the light sources in the gap above the reflective plate. The reflective plate comprises a plurality of elongate bumps, and the bumps face toward the diffusion sheet.

Other advantages and novel features will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe the present invention in detail.

Figure 1:
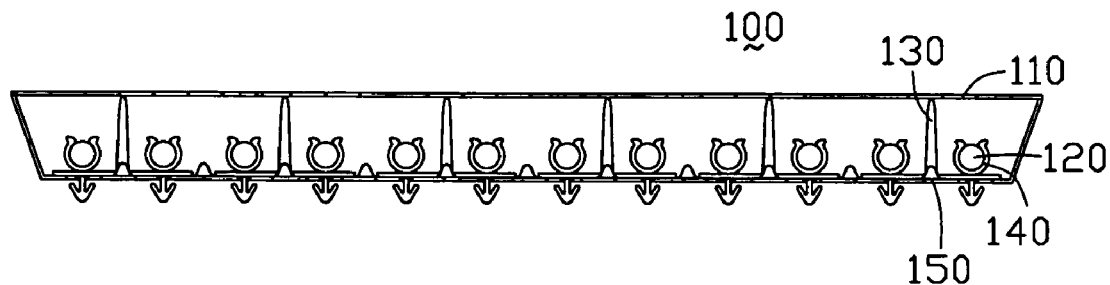
FIG. 1 is a side, cross-sectional view of a backlight module according to an exemplary embodiment of the present invention.

Referring to FIG. 1, this is a schematic, side cross-sectional view of a backlight module according to a first embodiment of the present invention. The backlight module 100 includes a diffusion sheet 110, a plurality of light sources 120, a plurality of supporting posts 130, a plurality of fasteners 140, and a reflective plate 150. The supporting posts 130 are disposed between the diffusion sheet 110 and the reflective plate 150, to maintain a gap with a predetermined distance between the diffusion sheet 110 and the reflective plate 150. The fasteners 140 are engaged with the reflective plate 150, and fasten corresponding light sources 120 in the gap between the diffusion sheet 110 and the reflective plate 150. Typically, the light sources 120 are elongate cold cathode fluorescent lamps (CCFLs) or the like.

Figure 2:
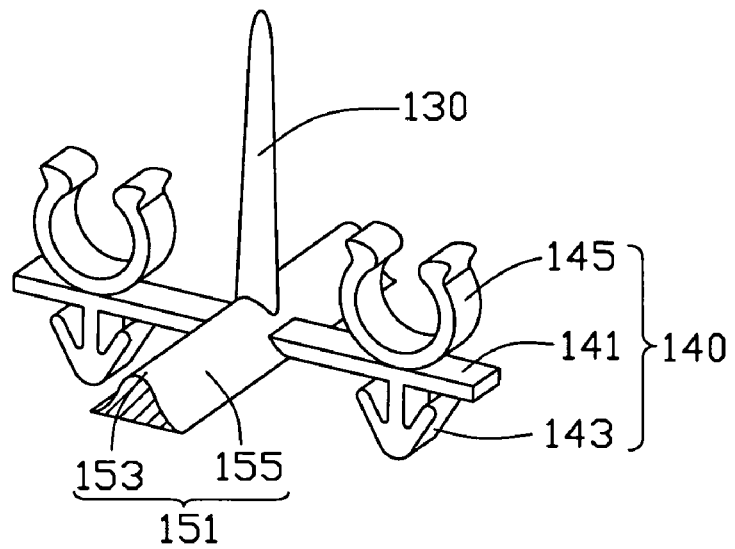
FIG. 2 is an enlarged view of a supporting post, part of a bump, and two fasteners of the backlight module of FIG. 1.
Figure 3:
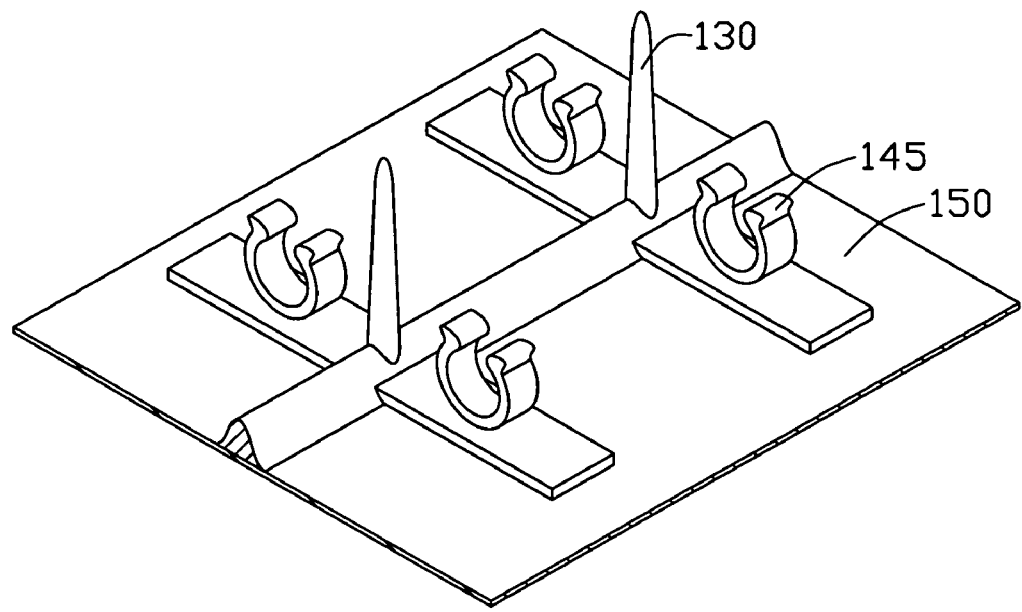
FIG. 3 is an enlarged, isometric view of part of the backlight module of FIG. 1, showing two supporting posts, four fasteners, and part of a bump disposed on a reflective plate.

Also referring to FIGS. 2-3, the reflective plate 150 is made of material having high reflectivity, such as aluminum, aluminum alloy, or a like material. The reflective plate 150 includes a plurality of elongate bumps 151. The bumps 151 are integrally formed with a flat main body (not labeled) of the reflective plate 150, and face toward the diffusion sheet 110. The bumps 151 are parallel to and uniformly spaced apart from each other, and are parallel to a side of the reflective plate 150. Each of the bumps 151 defines a top portion 153, and two curved surfaces 155 extending from respective opposite sides of the top portion 153 down to the flat main body of the reflective plate 150. The reflective plate 150 also defines a plurality of holes 157 (shown in FIG. 4) disposed adjacent to the bumps 151.

Each of the fasteners 140 include s base portion 141, a locating portion 143, and a fastening portion 145. The locating portion 143 extends vertically down from the base portion 141, and the fastening portion 145 extends up from the base portion 141.

Figure 4:
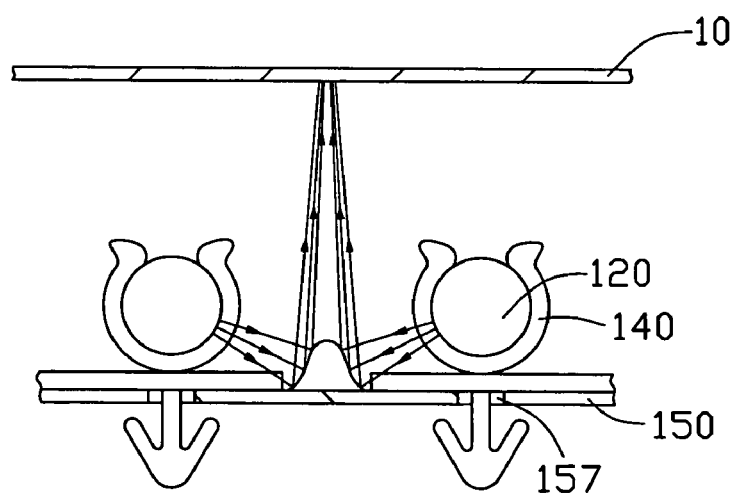
FIG. 4 is an enlarged view of part of the backlight module of FIG. 1, showing reflective optical paths thereof.
Figure 5:
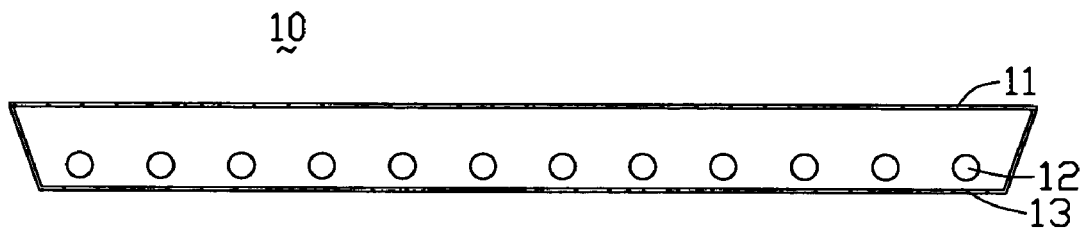
FIG. 5 is a side, cross-sectional view of a conventional backlight module.
Figure 6:
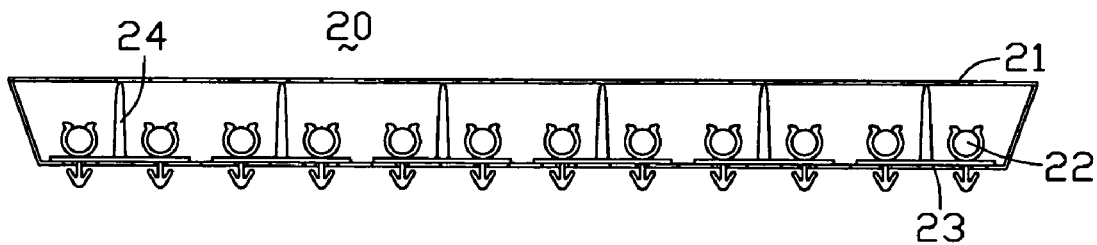
FIG. 6 is a side, cross-sectional view of another kind of conventional backlight module.
Figure 7:
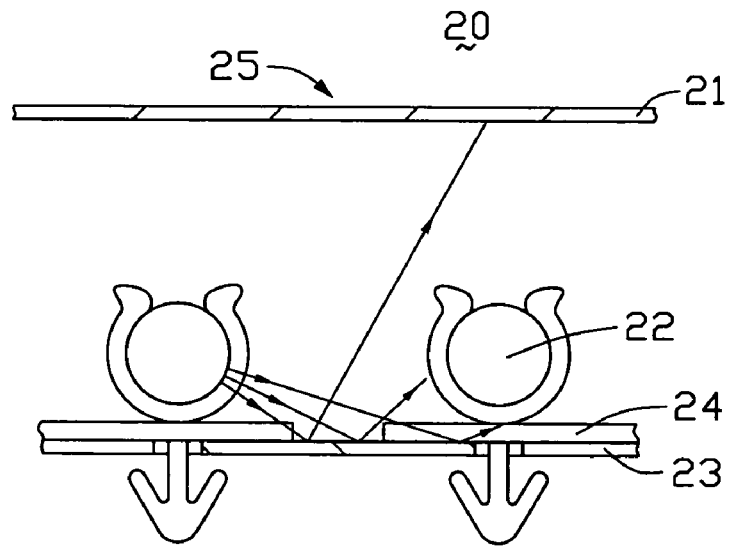
FIG. 7 is an enlarged view of part of the backlight module of FIG. 6, showing reflective optical paths thereof.

Also referring to FIG. 4, in assembly, the locating portion 143 of each fastener 140 is deformably inserted through a corresponding hole 157 of the reflective plate 150, whereby the locating portion 143 elastically abuts a bottom surface (not labeled) of the reflective plate 150 and fixes the fastener 140 to the reflective plate 150. Thereby, the base portion 141 of the fastener 140 is secured on a top surface (not labeled) of the reflective plate 150. In this way, pairs of fasteners 140 are symmetrically arranged adjacent opposite sides of the bumps 151 respectively. The light sources 120 are fixed in the fastening portions 145 of corresponding fasteners 140, whereby each light source 120 is located generally midway between two corresponding adjacent bumps 151. That is, the light sources 120 and the bumps 151 are arranged alternately from said side of the reflective plate 150 to an opposite side of the reflective plate 150. In the illustrated embodiment, the supporting posts 130 are disposed on the top portions 153 of the bumps 151, each supporting post 130 being located between a corresponding pair of fasteners 140.

Each bump 151 is located midway between two adjacent light sources 120. Therefore the curved surfaces 155 of the bump 151 reflect light beams such that the light beams are concentrated and guided toward a corresponding area of the diffusion sheet 110 above the bump 151. Accordingly, a light intensity distribution in the area of the diffusion sheet 110 above the bump 151 is closer to, or similar to, or the same as a light intensity distribution in each of areas of the diffusion sheet 110 above the two adjacent light sources 120. That is, the light beams that reach all areas of the diffusion sheet 110 enable the diffusion sheet 110 to have highly uniform light intensity overall.

The fasteners 140 may be made of material having high reflectivity, such as aluminum, aluminum alloy, or a like material. The supporting posts 130 may be integrally formed with the bumps 151 of the reflective plate 150.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module, comprising:
   a diffusion sheet;
   a plurality of elongate light sources;
   a plurality of supporting posts;
   a plurality of fasteners; and
   a reflective plate;
   wherein the supporting posts are disposed generally between the reflective plate and the diffusion sheet to form a gap with a predetermined distance between the reflective plate and the diffusion sheet, the fasteners are engaged with the reflective plate and hold the light sources thereby mounting the light sources in the gap above the reflective plate, the reflective plate comprises a plurality of elongate bumps, each of the bumps is located generally between and parallel to two corresponding of the light sources, and the bumps generally face toward the diffusion sheet and are parallel to each other and uniformly spaced apart from each other;
   each of the bumps defines a top portion, and two curved surfaces extending from respective opposite sides of the top portion down to a flat main body of the reflective plate; and
   the curved surfaces of each of the bumps are configured to reflect light beams received from adjacent of the light sources such that the light beams are concentrated and guided toward a corresponding area of the diffusion sheet above the bump.

* * * * *